US012106737B2

(12) United States Patent
Ginest

(10) Patent No.: US 12,106,737 B2
(45) Date of Patent: Oct. 1, 2024

(54) MODULAR NECK AND HEADSTOCK FOR STRINGED INSTRUMENTS

(71) Applicant: Chaz Ginest LLC, Watkins, CO (US)

(72) Inventor: Charles Ginest, Watkins, CO (US)

(73) Assignee: Chaz Ginest LLC, Watkins, CO (US)

( * ) Notice: Subject to any disclaimer, the term of this patent is extended or adjusted under 35 U.S.C. 154(b) by 0 days.

(21) Appl. No.: 17/544,277

(22) Filed: Dec. 7, 2021

(65) Prior Publication Data

US 2022/0189437 A1 Jun. 16, 2022

Related U.S. Application Data

(60) Provisional application No. 63/125,262, filed on Dec. 14, 2020.

(51) Int. Cl.
*G10D 3/095* (2020.01)
*G10D 1/08* (2006.01)

(52) U.S. Cl.
CPC ............... *G10D 3/095* (2020.02); *G10D 1/08* (2013.01)

(58) Field of Classification Search
CPC ........... G10D 3/095; G10D 1/08; G10D 3/00; G10D 1/00
See application file for complete search history.

(56) References Cited

U.S. PATENT DOCUMENTS 6,198,030 B1 * 3/2001 Rose ........................ G10H 1/44 84/293
2021/0241726 A1 * 8/2021 Brain ..................... G10D 3/095

* cited by examiner

*Primary Examiner* — Kimberly R Lockett
(74) *Attorney, Agent, or Firm* — Rutan & Tucker LLP

(57) ABSTRACT

Modular stringed instruments are discussed herein. The modular stringed instruments allow users to more efficiently transport the stringed instrument, replace broken parts, or personalize or customize the stringed instrument. They include a bracket, a neck, and a headstock. The neck and the headstock are separate pieces which are adjoined together, such as by the bracket and a connector bolt, and can be separated from each other when it is desirous or necessary to do so. The bracket opposes or resists forces caused by the strings of the stringed instrument when the strings are placed under tension and extend from a body, such as from a bridge of the body, to the headstock.

19 Claims, 13 Drawing Sheets

MODULAR NECK AND HEADSTOCK FOR STRINGED INSTRUMENTS

CROSS-REFERENCE TO RELATED APPLICATIONS

This application claims priority and benefit from the U.S. Provisional Patent Application 63/125,262, filed Dec. 14, 2020 and titled, "MODULAR NECK AND HEADSTOCK FOR STRINGED INSTRUMENT," which are incorporated herein by reference in their entirety for all purposes.

BACKGROUND

Stringed instruments, such as guitars, are generally constructed and assembled from one or two large pieces. This type of assembly can make transportation of the stringed instrument more difficult. Since the stringed instrument cannot be readily disassembled into smaller pieces, the size of the stringed instrument then becomes the amount of space needed in a vehicle or a storage unit in which to hold or transport the stringed instrument. For example, a cello can be up to 48 inches in length. As another example, a bass guitar can be up to 36 inches in length. Increased space can require the musician to pay more for shipping or transportation (e.g., buy an extra seat on a plane or pay for enlarged check-on baggage). This can also require the musician to find ample space to store the stringed instrument.

Furthermore, this type of assembly makes replacing one or more components of the stringed instrument difficult. Current stringed instrument manufacturers do not consider compatibility of parts across models or product lines. The assembly reduces the ability or efficiency by which a musician can interchange components. For example, if a headstock of a guitar breaks, the musician, at best, must replace the entire neck and headstock. And, at worst, the musician must replace the entire guitar. Furthermore, the assembly also limits the look of stock stringed instrument. Musicians may also want to personalize or customize certain aspects of their stringed instrument. For example, a first musician may like the sound generated by a first guitar body. However, that musician may not like the look or feel of the neck or headstock. The musician can either settle for the undesired neck and headstock or can continue looking for a more desirable guitar.

What is needed is a stringed instrument having improved transportability. What is further needed is a stringed instrument having improved construction.

DETAILED DESCRIPTION

Kits and methods for using modular stringed instruments are discussed herein. The modular stringed instrument allows a user to more efficiently transport the stringed instrument by disassembling the stringed instrument into smaller, more portable pieces. The modular stringed instrument also allows the user to more efficiently replace broken parts, such as a broken body, neck, or headstock. The modular stringed instrument yet further allows the user to personalize or customize the stringed instrument by being able to interchange components of the stringed instrument to obtain a more desirable look.

The modular stringed instruments of the disclosed kits include a connector bolt, a neck, and a headstock. The neck and headstock are separably attached (i.e., the neck and the headstock are separate pieces which are adjoined together and can be separated from each other when it is desirous or necessary to do so). The connector bolt opposes or resists forces caused by the strings of the stringed instrument, such as when the strings are placed under tension. When under tension, the strings, which extend from the body to the headstock, pull the headstock towards the body. The modularity of the guitar can place a moment arm at a neck-headstock interface. The moment arm and the tension can cause torque on the headstock at the neck-headstock interface.

The kits can also include a bracket to connect the neck and the headstock. The bracket opposes or resists forces caused by the strings of the stringed instrument, such as when the strings are placed under tension. When under tension, the strings, which extend from the body to the headstock, pull the headstock towards the body. The modularity of the guitar can place a moment arm at a neck-headstock interface. The moment arm and the tension can cause torque on the headstock at the neck-headstock interface.

For ease of description, the description below refers to a guitar as an example stringed instrument. However, the disclosure is not intended to be so limited. The stringed instrument can be a cello, a bass, a violin, a fiddle, a viola, a double bass, a banjo, or the like.

For ease of description, the description below refers to a bolt to attach or partially attach the neck to the headstock. However, the disclosure is not intended to be so limited. The neck can be attached or partially attached to the headstock via a screw, a pin, a rod, a rivet, a nail, or the like. In one example, the bolt is threaded.

Figure 1:
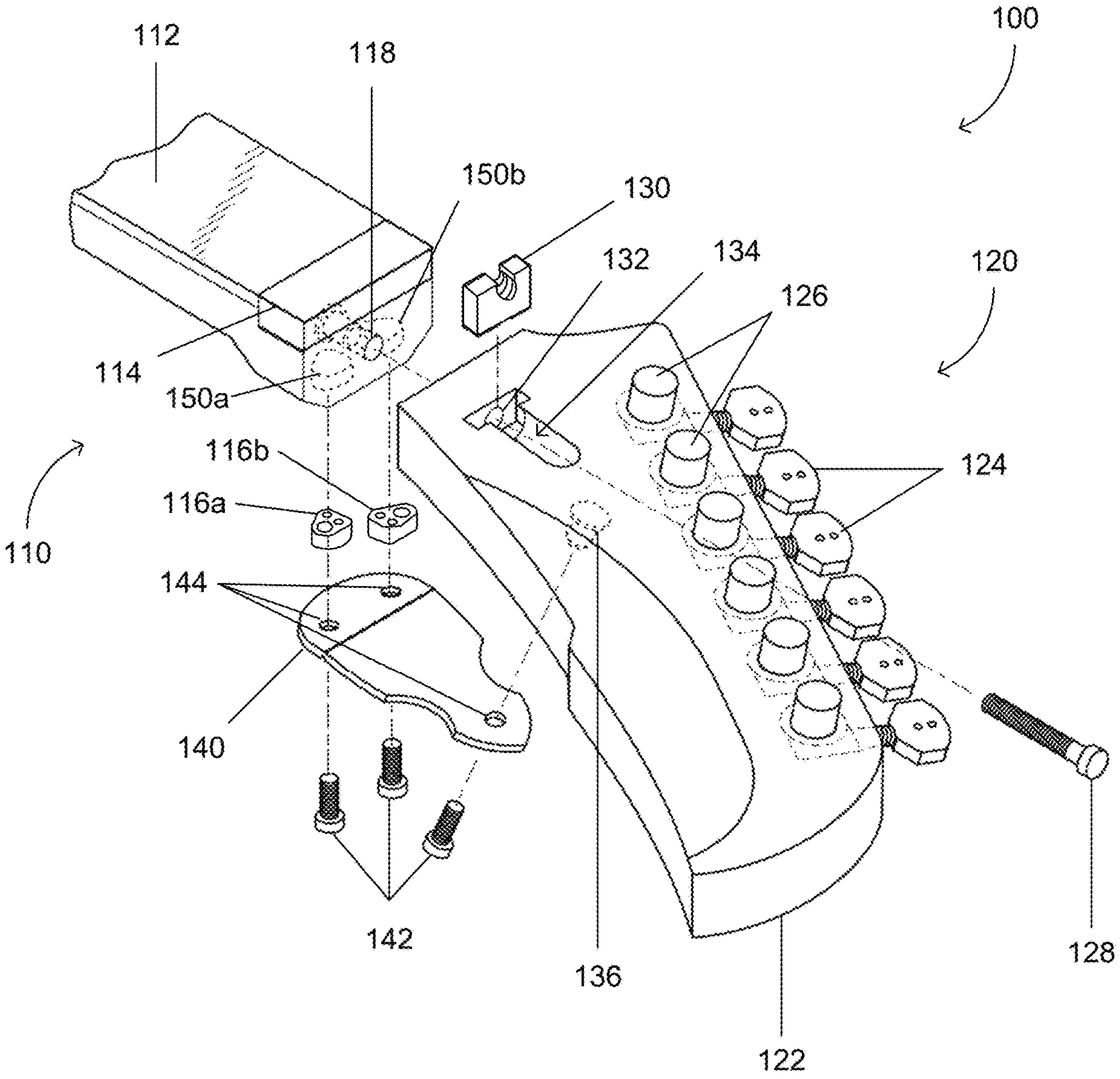
FIG. 1 illustrates an exploded view of an example stringed instrument.

FIG. 1 shows an exploded view of a modular kit 100. The modular kit 100 includes a neck 110 and a headstock 120. The headstock 120 can be connected to the neck 110 via a connector bolt 128. The headstock 120 can also be connected to the neck 110 via a bracket 140.

The bracket 140 holds the neck 110 and the headstock 120 together. The bracket 140 also opposes or resists a force caused by the strings of the guitar when the strings are placed under tension. The strings can extend from a bridge (not shown) of a body (not shown) to tuning keys of the headstock 120. When under tension, the strings pull the headstock 120 towards the body (not shown). The modularity of the kit 100 can place a moment arm at a neck-headstock interface (i.e., where the neck 110 and the headstock 120 meet). The moment arm and the tension can cause a torque to be applied to the headstock 120 at the neck-headstock interface. In one example, the bracket 140 can oppose the force of the strings (i.e., apply forces to the neck-headstock exchange in a direction opposite the torque caused by the strings). The bracket 140 can be placed under tension upon installation in a direction opposite that of the direction of the tension provided by the strings. The bracket 140 can be bent away from the neck 110 and the headstock 120, such that when installed, the force pulls the headstock 120 in the direction opposite the direction in which the strings pull the headstock. In another example, the bracket 140 can resist the force of the strings. The bracket 140, when installed, increases the stiffness of the neck-headstock interface, such that a greater force by the strings is required to dislodge the headstock 120 from the neck 110. In yet another example, the bracket 140, when installed, can oppose and resist the forces applied to the neck-headstock interface by the strings.

Figure 6:
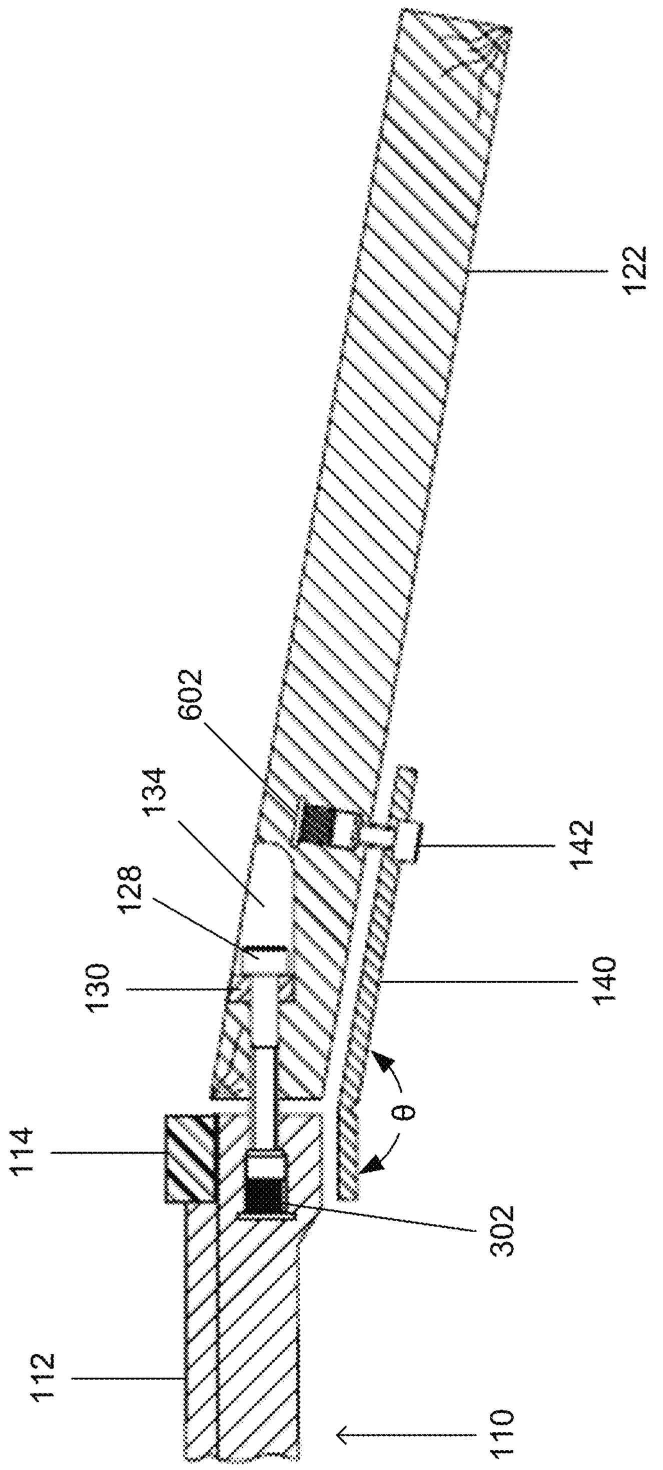
FIG. 6 illustrates a cross-section of the example stringed instrument.
Figure 7:
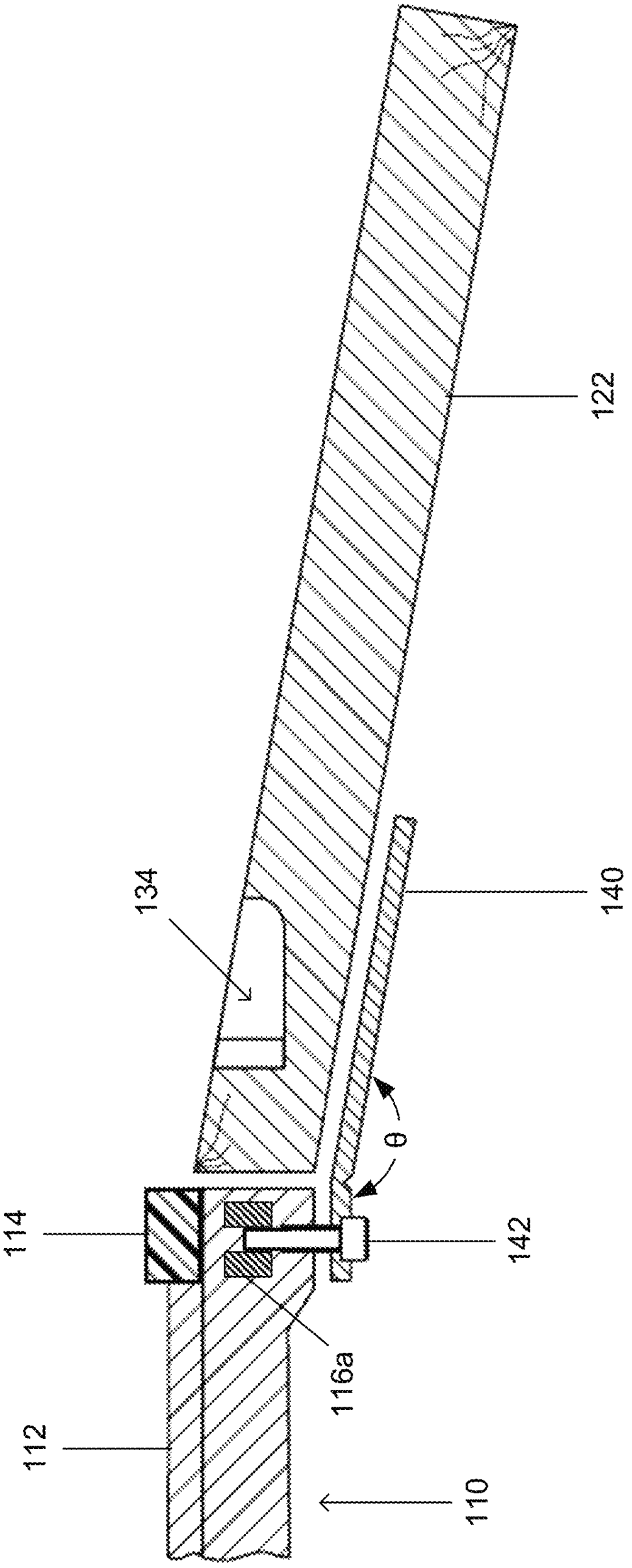
FIG. 7 illustrates a cross-section of the example stringed instrument.

The bracket 140 includes holes 144 through which bracket bolts 142 can pass to attach the bracket 140 to the neck 110 and the headstock 120. In one example, the bracket 140 is straight. The straight bracket can be used, for example, when surfaces of the neck 110 and the headstock 120, to which the straight bracket is attached, form a straight line when connected. In another example, the bracket 140 is curved or bent, such that a first segment is adjoined to the neck 110 and a second segment is adjoined to the headstock 120. The first and second segments are not parallel with each other. The curved or angled bracket can be used, for example, when surfaces of the neck 110 and the headstock 120 to which the curved or angled bracket is attached form an angle when connected (θ, as seen in FIGS. 6 and 7). The bracket 140 can also include a notch between the first and second segments to maintain structural integrity of the bracket 140 when the bracket is bent or curved to a desired angle. The angle can be selected to provide increased force resistance or opposition, such that the angle is greater than 0° and less than 90°, including 5°-30°, 5°-20°, 10°, or the like.

The headstock 120 includes a main body 122. The main body 122 includes a cavity 134 which includes a washer 130. The cavity 134 can be T-shaped. The horizontal arm of the T-shape accepts the washer 130 and the vertical arm allows the connector bolt 128 to access a hole 132. A depth of the vertical arm can be tapered, angled, or equal to a depth of the horizontal arm. The washer 130 can distribute the force of the connector bolt 128 exerted on the main body 122. The washer 130 can also prevent the connector bolt 128 from moving within the cavity 134. The washer 130 can also more securely hold the connector bolt 128 in place. The washer 130 can be threaded or unthreaded. In one example, the washer 130 is U-shaped, such that an open end is directed into the cavity 134 and a closed end is directed outwardly. In another example, the washer 130 is U-shaped, such that the closed end is directed into the cavity 134 and the open end is directed outwardly. When the open end is directed outwardly, the connector bolt 128 can be inserted downwardly through the open end. This allows for a shorter bolt to be used. In yet another example, the washer 130 is circular.

The connector bolt 128 can be used to connect the headstock 120 to the neck 110. The connector bolt 128 is inserted through the hole 132 via the cavity 134 and into a bore 118 of the neck 110. The hole 132 is at an end of the main body 122 that is proximal to the neck 110. The bore 118 is located at an end of the neck 110 proximal to the headstock 120. The bore 118 extends a given distance into the end of the neck 110 at which the bore 118 is located. The bore 118 can also extend between inserts **116*a*, 116*b* to allow for the connector bolt 128 to be inserted into the neck 110 while also allowing for the bracket 140 to be connected to the neck 110 via the inserts 116*a*, 116*b***.

The connector bolt 128 can be tightened, such as by rotating around an axis (e.g., screwed), to increase the force on the headstock 120 and the neck 110. In one example, the bore 118 is threaded. In another example, the bore 118 is unthreaded. In yet another example, the bore 118 includes a threaded nut (not shown) to receive the connector bolt 128.

The headstock 120 can also include tuning keys. Each tuning key includes a key 124 adjoined to a peg 126. Each string is tuned to a desired frequency by tensioning the strings with tuning keys on the headstock 120. The string is inserted through a hole in the peg 126. The key 124 is rotated, which rotates the peg 126 causing the string to be pulled around the peg. The key 124 is rotated until the desired frequency of the string is obtained.

The headstock 120 can be any shape. For example, the headstock can be 3+3 (i.e., having 3 tuning keys on each side), 6 a in line (i.e., having 6 tuning keys on a side), or the like. As another example, the headstock can be traditional, pointed, ASM, widow, breast, V-shaped, curved, or the like.

The main body 122 can also include a bore 136 to accept one of the bracket bolts 142. One of the bracket bolts 142 can adjoin the bracket 140 to the main body 122. In one example, the bore 136 is threaded. In another example, the bore 136 is unthreaded. In yet another example, the bore 136 includes a threaded nut (not shown) to receive the bracket bolt 142.

The neck 110 includes a fingerboard 112 and the bore 118. The fingerboard 112 is a surface on the neck 110 against which strings (not shown) can be pressed. When the strings are pressed at a location between the tuning keys and the bridge of the body, a playing length of the string is shortened. This decreases the wavelength of a wave generated by the vibrating string, which increases the frequency of the wave (i.e., a higher pitched note).

The neck 110 also includes the inserts **116*a*, 116*b*. The inserts 116*a*, 116*b* can be pushed, tapped, or screwed into cavities 150*a*, 150*b* formed within the neck 110 and into cavities formed within a plug 202. An adhesive or epoxy can also be used to adhere the plug 202 to the neck 110. An external surface of the inserts 116*a*, 116*b*, such as sidewalls, can be threaded. The threads can increase the force necessary to pull the inserts 116*a*, 116*b* out of the neck 110 and the plug 202, thereby increasing the opposing or resistive force of the bracket 140** relative to the force of the strings.

The inserts **116*a*, 116*b* each include holes. The plug 202 includes holes at corresponding locations to the holes of the inserts 116*a*, 116*b* when the inserts 116*a*, 116*b* are inserted into the plug 202**.

Each of the holes of the inserts **116*a*, 116*b* and the plug 202 can receive one of the bracket bolts 142. The holes can be threaded or unthreaded. When the inserts 116*a*, 116*b* include multiple holes, the multiples holes allow for the varying bracket placement and orientation, rather than requiring the bracket 140 to be placed in a set location and orientation, while still allowing for the bore 118 to pass between the inserts 116*a*, 116*b*. The inserts 116*a*, 116*b* can include a larger hole and smaller holes. The smaller holes in the inserts 116*a*, 116*b*** can be threaded and can allow for mounting of a variety of different types of existing stringed instrument nut designs.

Figure 3:
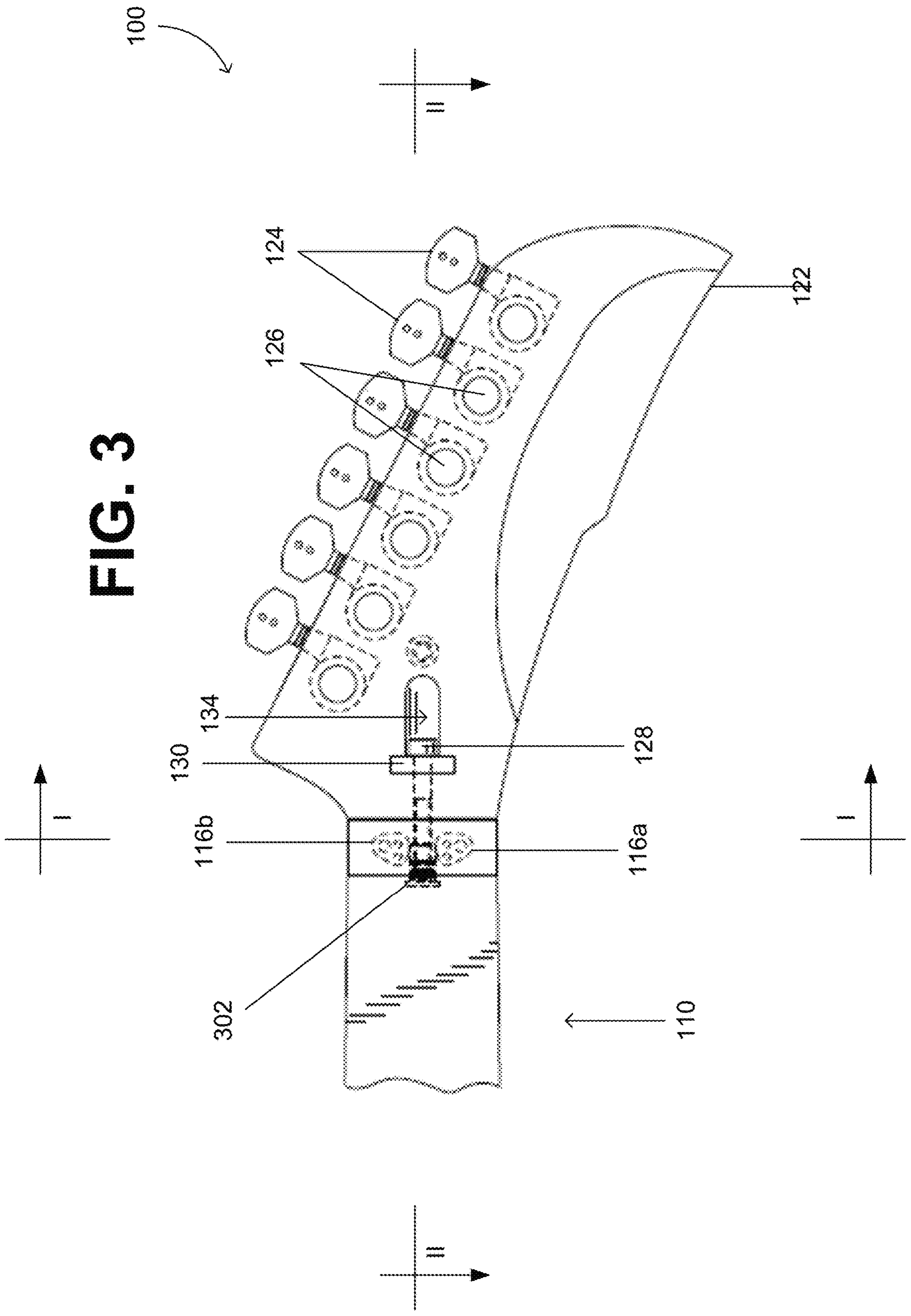
FIG. 3 illustrates the example stringed instrument, as assembled.

In another example, as shown in 302 of FIG. 3.

B, the inserts 116*a*, 116*b* are replaced by holes 212. The holes 212 can be threaded, can be unthreaded, or can include a threaded nut (not shown) to receive the bracket bolts 142. When the neck 110 includes holes 212, the inserts 116*a*, 116*b* can be included or not included.

Figure 2A:
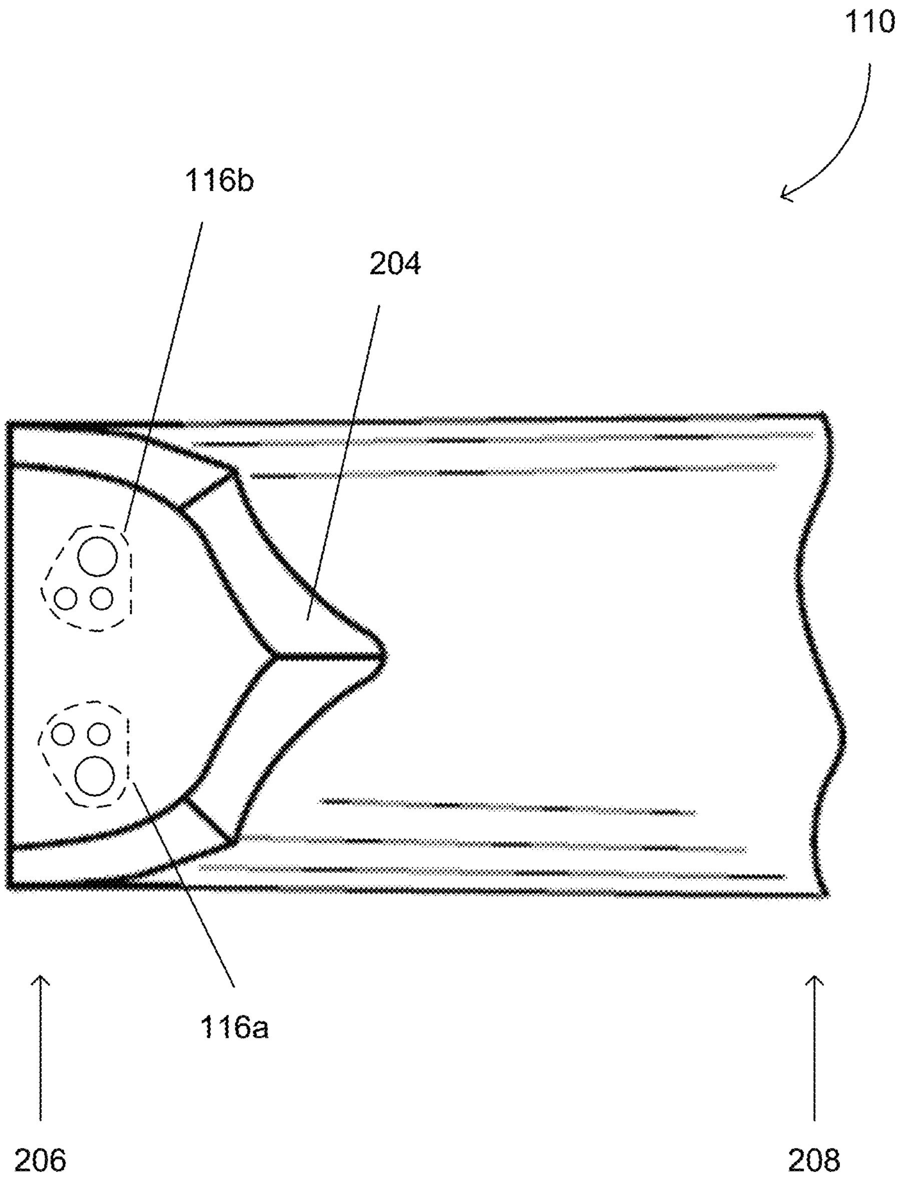
FIG. 2A illustrates an example neck of the example stringed instrument.
Figure 2B:
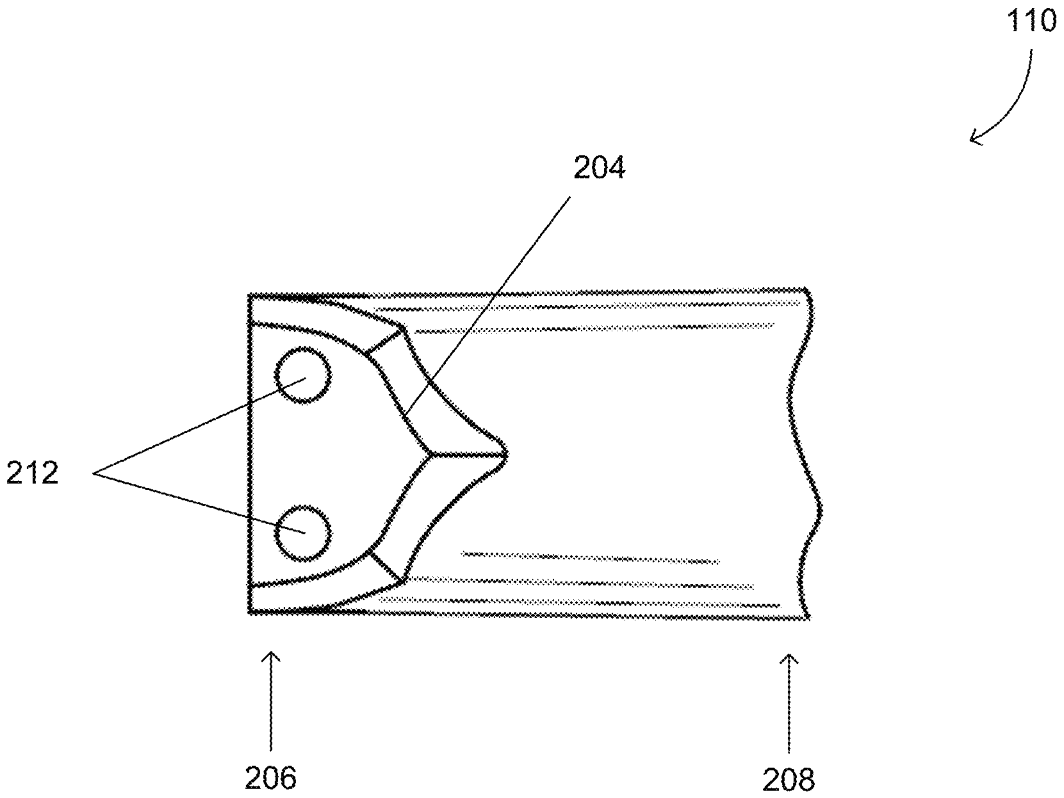
FIG. 2B illustrates an example neck.

The neck 110, as shown in FIGS. 2A-2B, can also include an elevation 204 at a first end 206. The elevation 204 is a thicker section of the neck 110 to provide more strength at the first end 206. The first end 206 of the neck 110 is proximal to the headstock 120. A second end 208 of the neck 110 is proximal to the body.

Returning to FIG. 1, the neck 110 can also include a locking nut 114. The locking nut 114 allows the strings to be locked at two places—at the bridge and at a point on the neck 110. The locking nut 114 keeps the strings in tune despite extensive tremolo use, divebombs, temperature changes, or the like. The locking nut 114 can also shift the moment arm for the strings relative to the neck 110 and the headstock 120. For example, the torque exerted on the headstock 120 by the strings is now relative to the location of the locking nut 114. This shortens the moment arm relative to no locking nut, thereby reducing the torque relative to no locking nut.

FIG. 3 shows a front side of the modular kit 100 having been assembled. The neck 110 of the modular kit 100, as discussed above, can include a nut 302 in the bore 118 to lock or secure the connector bolt 128 into the neck 110. The nut 302 can be threaded.

Figure 4:
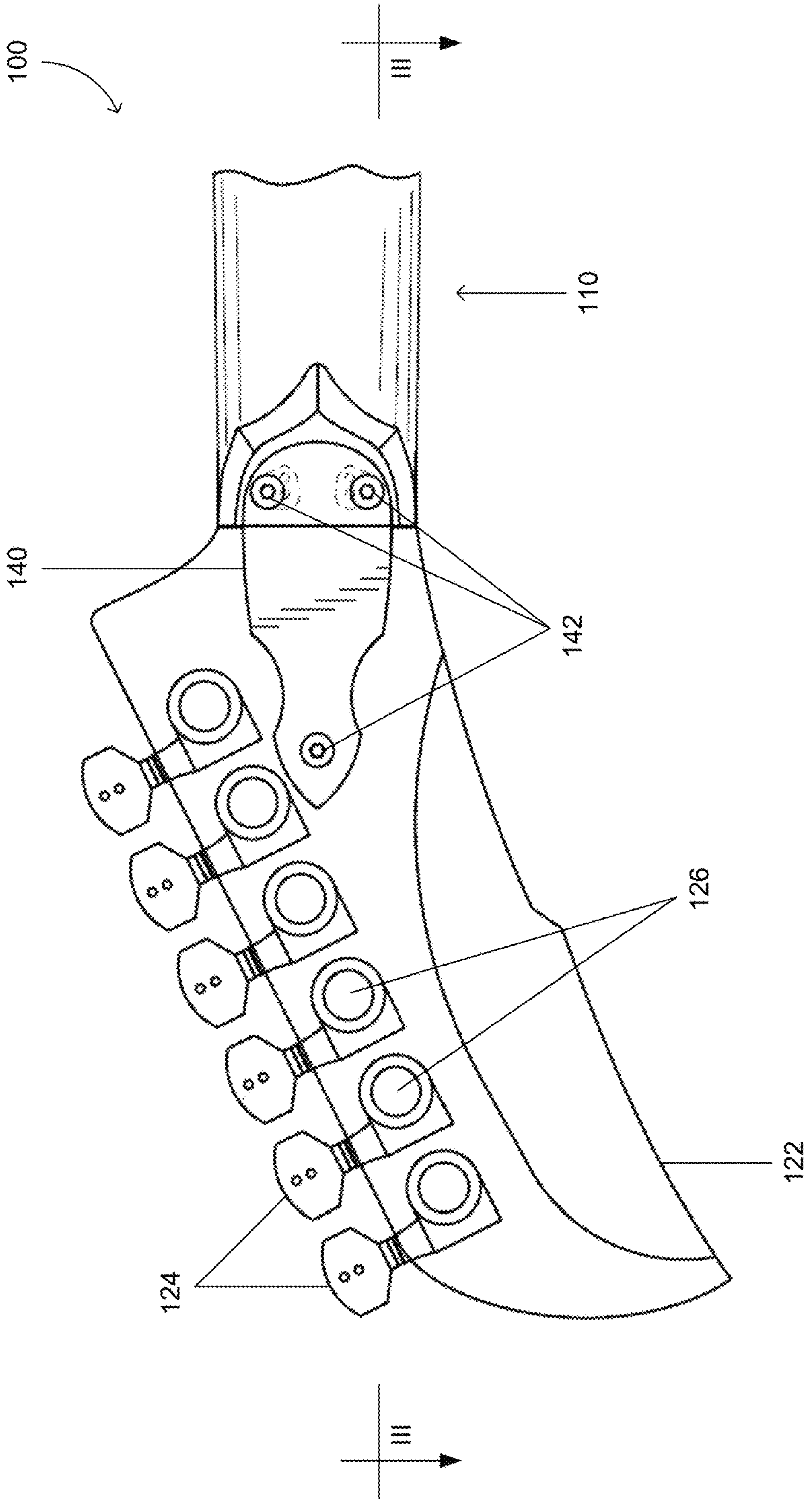
FIG. 4 illustrates the example stringed instrument, as assembled.

FIG. 4 shows a back side of the modular kit 100 having been assembled.

Figure 5:
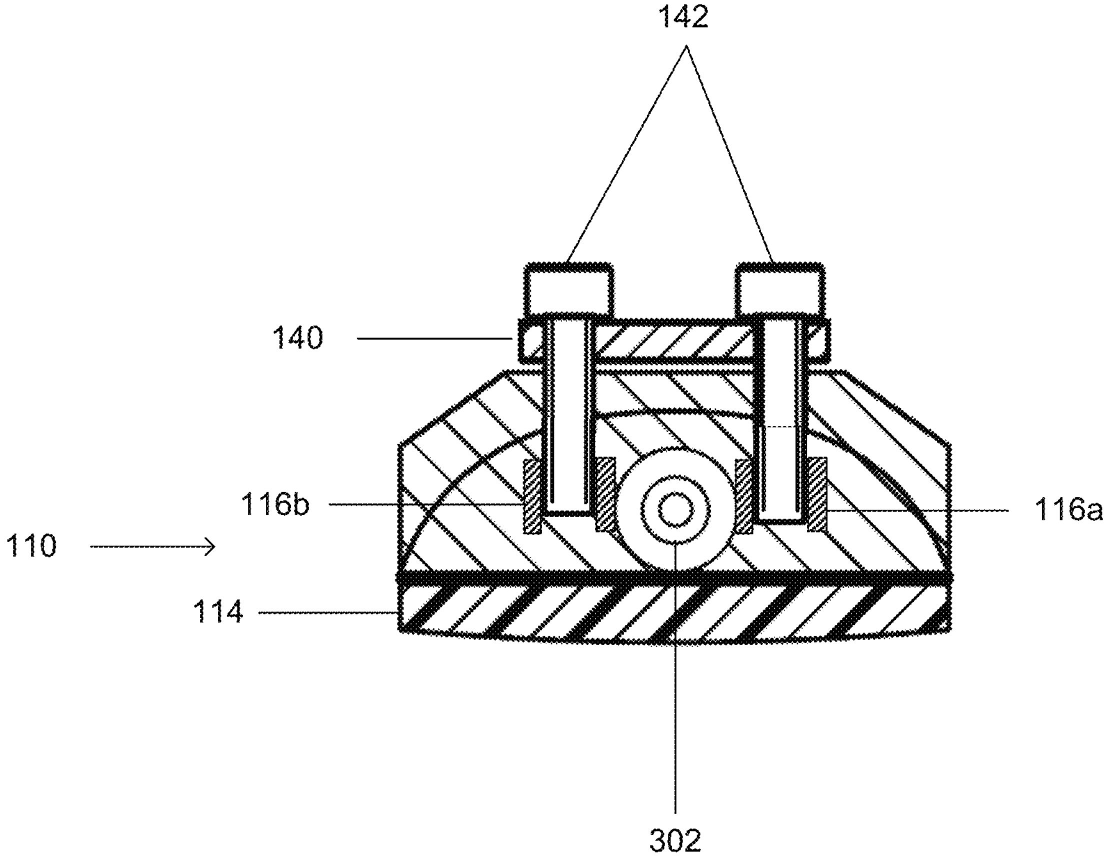
FIG. 5 illustrates a cross-section of the example neck.

FIG. 5 shows a cross-section of the modular kit 100 taken along the line I-I of FIG. 3.

FIG. 6 shows a cross-section of the modular kit 100 taken along the line II-II of FIG. 3. The headstock 120 of the modular kit 100, as discussed above, can include a nut 602 in the bore (not shown in FIG. 6) to lock one of the bracket bolts 142 into the main body 122.

FIG. 7 shows a cross-section of the modular kit 100 taken along the line of FIG. 4.

Figure 8A:
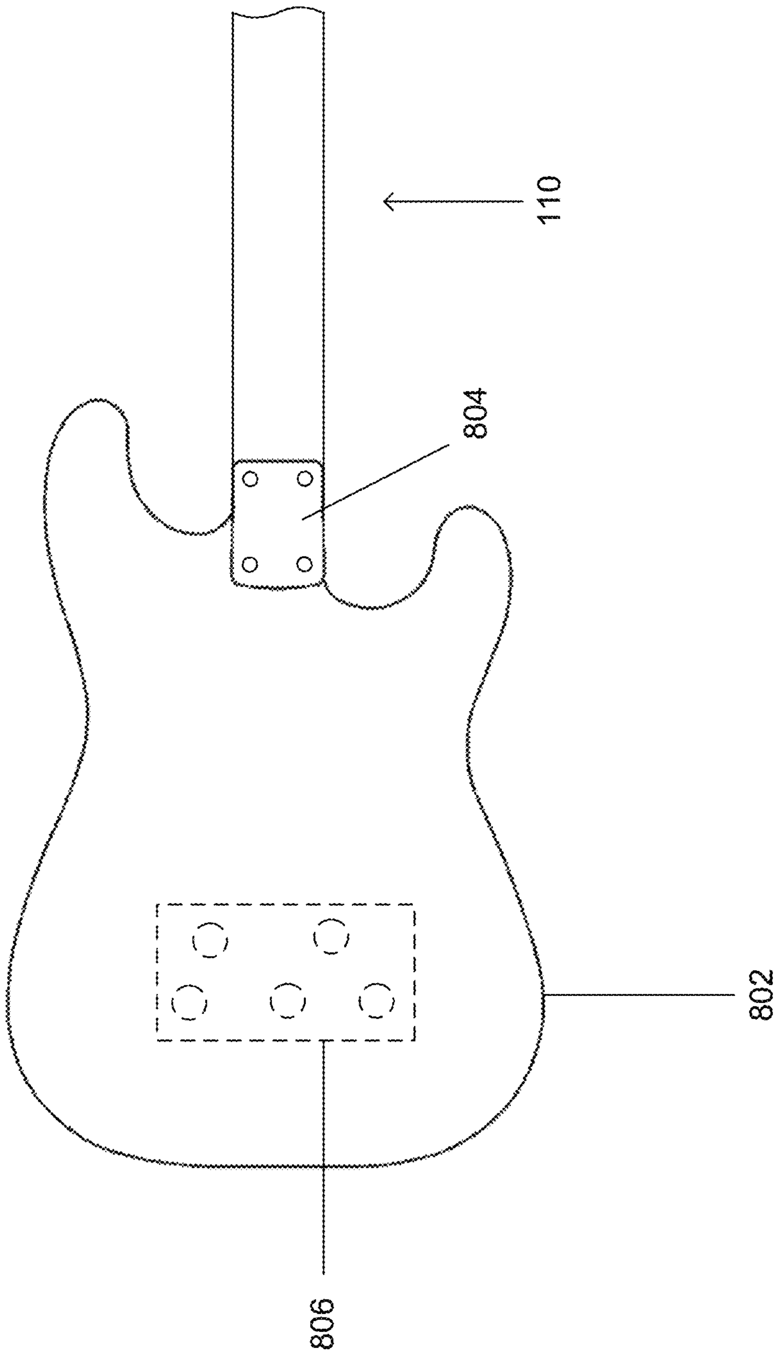
FIGS. 8A-8B illustrate an example body and the example neck of an example stringed instrument.

FIG. 8A shows a back side of a body 802 of the stringed instrument. The stringed instrument includes a connector plate 804 to connect the neck 110 to the body 802. The connector plate 804 can include holes through which screws or bolts can be placed to attach the connector plate 804 to the body 802 and the neck 110.

Figure 10B:
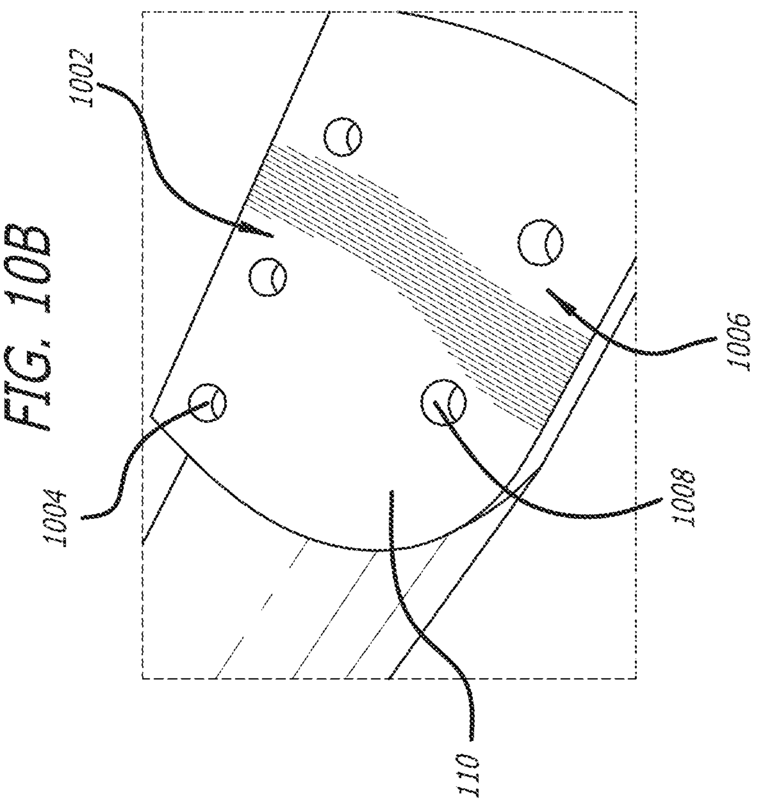
FIGS. 10A-10B illustrate example neck plugs.
Figure 10A:
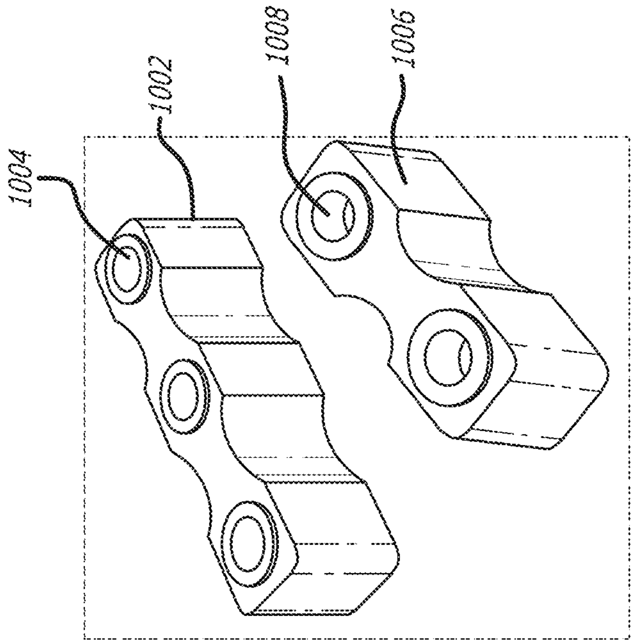

A part of the neck 110 proximal to the body 802 includes threads 1004, 1008 embedded therein, as shown in FIGS. 10A and 10B. When connecting the neck 110 to the body 802, the embedded threads 1004, 1008 and the bolts increase mechanical pull out resistance for durability and longevity of the stringed instrument. This also creates forces, such as active forces, to acoustically couple the neck 110 with the body 802 for greater resonance, improved tone, the like, or combinations thereof. The embedded threads 1004, 1008 can be part of plugs 1002, 1006, respectively, inserted into a cavity of the neck 110 and retained by a press fit or an adhesive, similar to the plug 202, as discussed above.

Figure 8B:
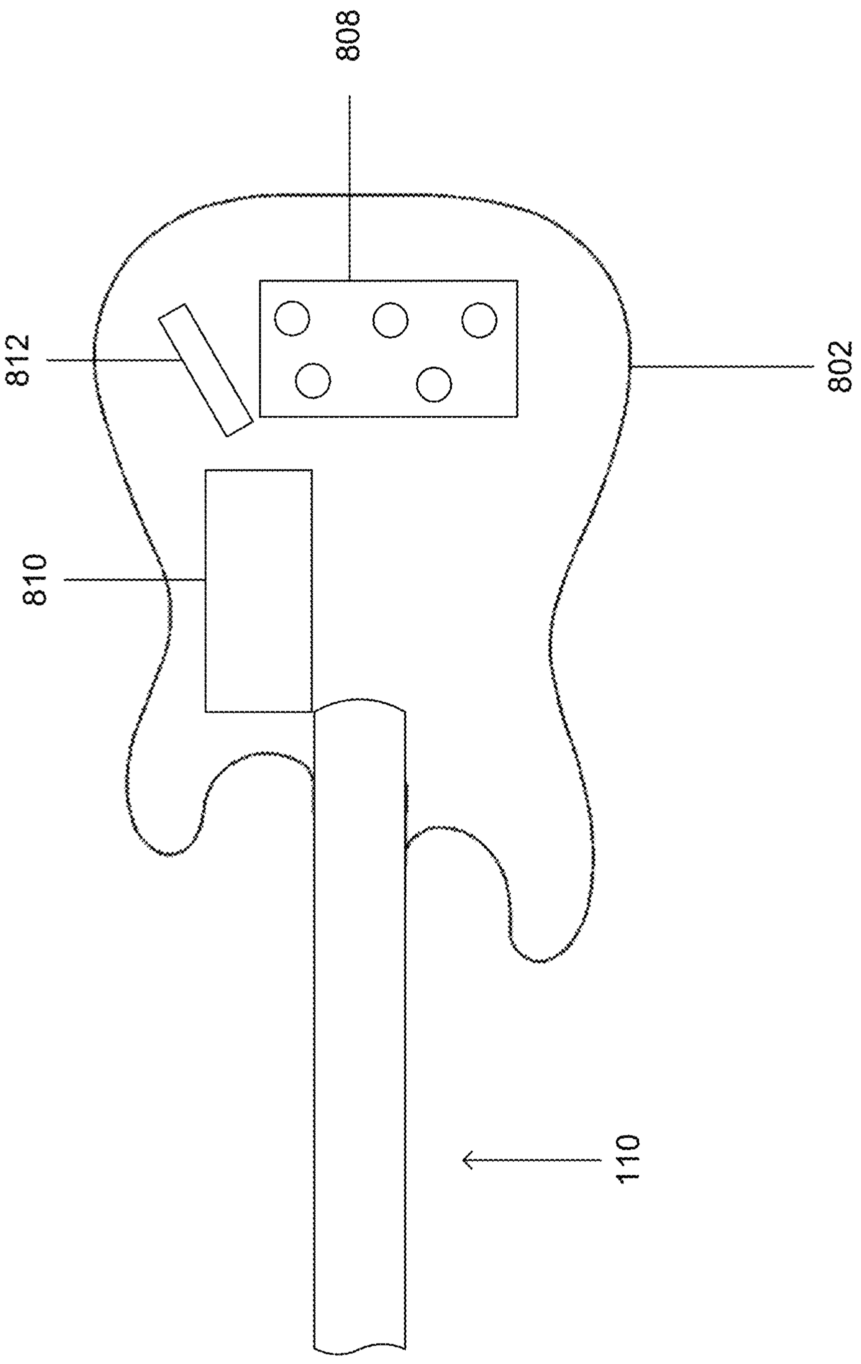

FIG. 8B shows a front side of the body 802 of the stringed instrument. The body 802 can include a back plate 806, an output jack 812, a bridge 808, a pickguard 810, or combinations thereof. The output jack 812 is a connector to output a signal of the guitar (e.g., sound) to an amplifier via a wired or wireless connection. The output jack 812 can be removable, such as to replace the output jack 812 or exchange output jacks based on desired output characteristics or parameters.

Figure 9B:
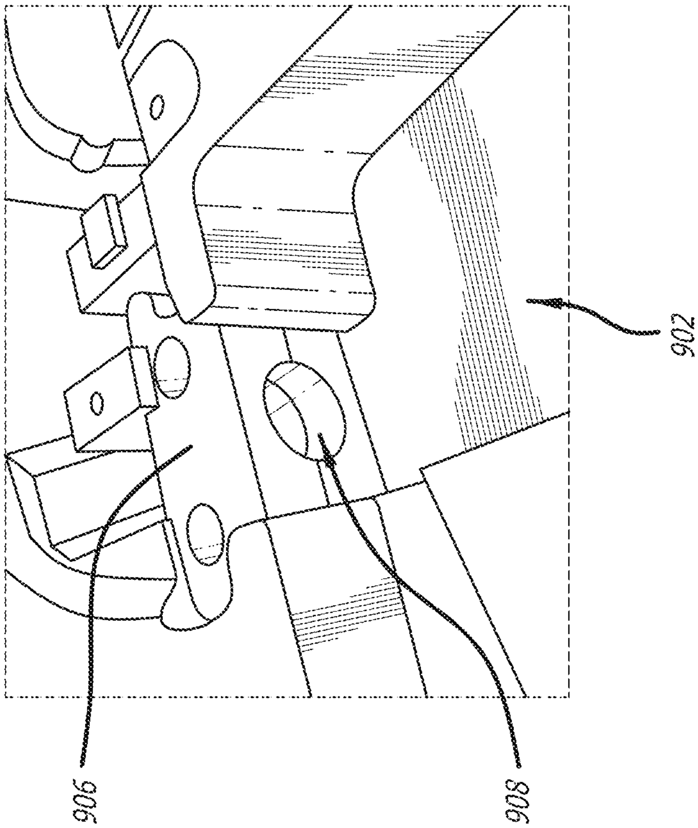
FIGS. 9A-9B illustrate an example portion of the instrument body that makes the output jack removable.
Figure 9A:
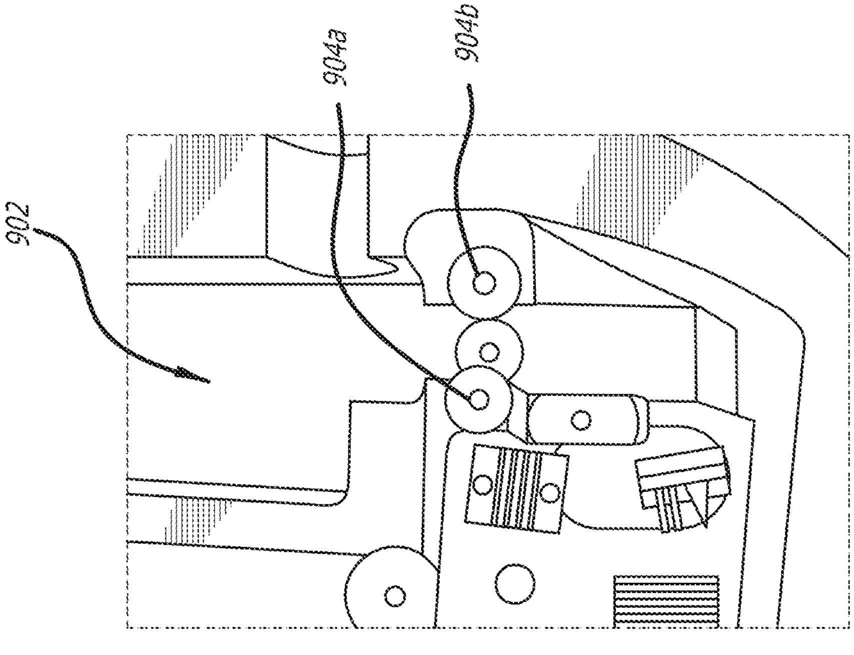

FIGS. 9A and 9B shows an internal structure of the body 802 to make the output jack 812 removable. The internal structure includes an internal bracket 906 having holes and a cutout to accept half of the output jack 812. The internal bracket 906 can be inserted to lock down the output jack 812 or can be removed to permit the output jack 812 to be removed or exchanged. The internal bracket 906 aligns with complementary threads 904*a*, 904*b* and a complementary cutout. The complementary cutouts form a hole 908 through which the output jack 812 can extend. The output jack 812 or a portion thereof can be house within an electronics cavity 902. Bolts or screws can be inserted through the holes of the internal bracket 906 and threaded into the embedded threads 904*a*, 904*b*. The embedded threads 904*a*, 904*b* can be included in a plug which can be adhered to the body 802 to increase resistance to being pulled out.

Returning to FIGS. 8A-8B, the pickguard 810 protects a portion of the body 802 against damage (e.g., nicks, dents, scratches, or the like) when the strings are strummed or played with a finger, a pick, or another device (e.g., a bow).

The bridge 808 supports the strings and transmits the vibration of those strings to another component, such as a soundboard. The body 802 also includes the back plate 806 embedded within an internal surface of the body 802. Bolts or screws can extend from the bridge 808 to the back plate 806. The bolts or screws can apply a force, such as an active force, with the body 802 locked or clamped in between. This can acoustically couple the bridge 808 to the back plate for greater resonance, improved tone, the like, or combinations thereof.

Figure 11:
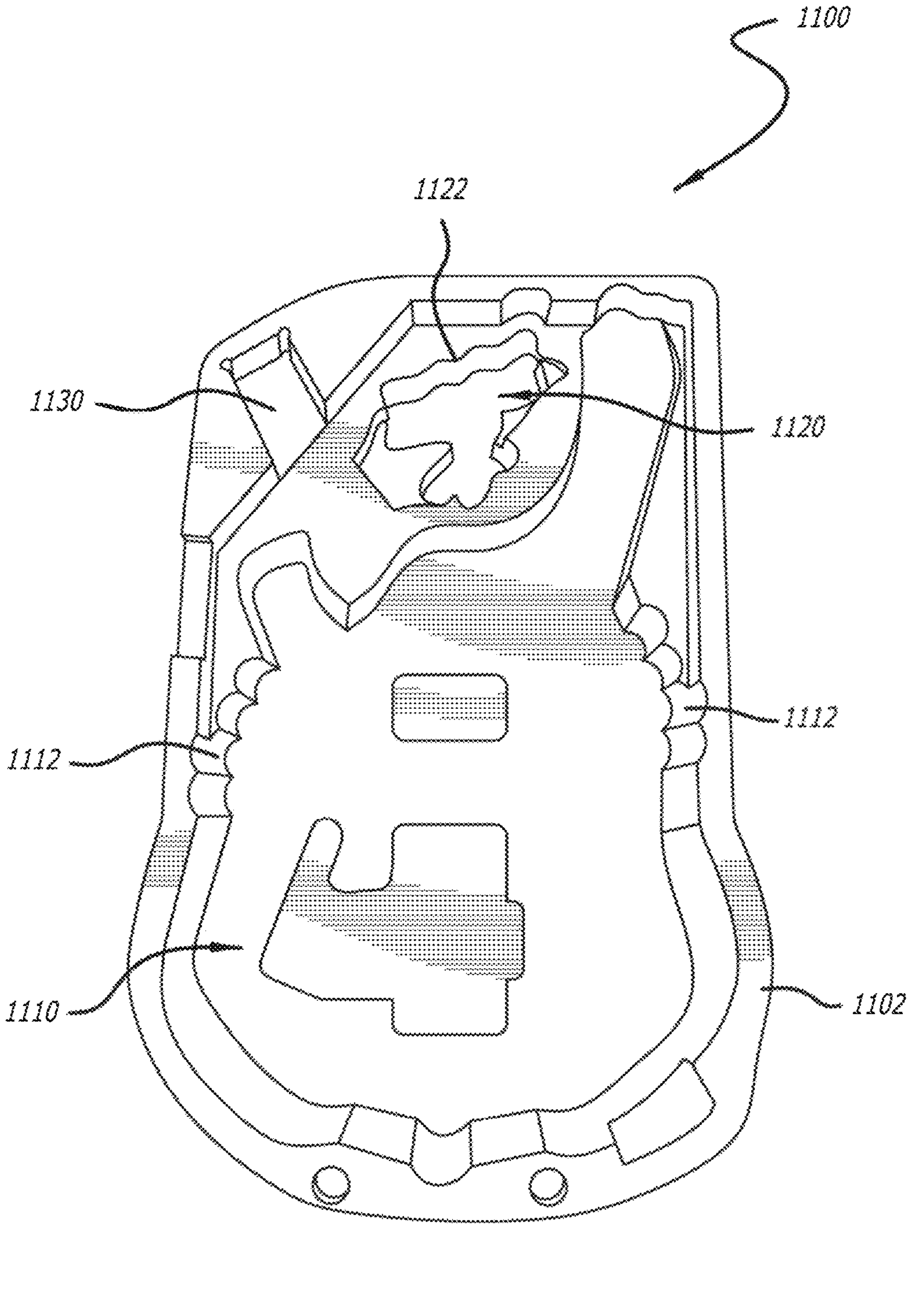
FIG. 11 illustrates an example case.

FIG. 11 shows a case 1100 in which to store a disassembled stringed instrument. The case 1100 is more compact than a traditional stringed instrument case, thereby occupying smaller space. The case 1100 also accounts for the modularity of the stringed instrument.

The case 1100 includes a main body 1102 to protect the components of the stringed instrument when placed within the case 1100. The main body 1102 includes a first cavity 1110 in which to store the body 802 of the stringed instrument. The first cavity 1110 can be complementary in shape to the main body 802. The first cavity 1110 can be sized to provide minimal clearance (e.g., 1 millimeter, 1 centimeter, or the like) or no clearance (e.g., the body 802 contacts the sidewall) of the body 802 relative to a sidewall of the first cavity 1110 when the body 802 is within the first cavity 1110. The first cavity 1110 also includes finger slots 1112 to allow for minimal to no clearance of the body 802 to the sidewall of the first cavity 1110, while permitting the user to more readily or easily insert or remove the body 802 from the first cavity 1110.

The main body 1102 also includes a second cavity 1120 in which to store the headstock 120 or the main body 122, individually, of the headstock 120 of the stringed instrument. The second cavity 1120 can complementary in shape to the headstock 120. The second cavity 1120 can be sized to provide minimal clearance (e.g., 1 millimeter, 1 centimeter, or the like) or no clearance (e.g., the headstock 120 or the main body 122, individually, of the headstock 120 contacts the sidewall) of the headstock 120 or the main body 122, individually, of the headstock 120 relative to a sidewall of the second cavity 1120 when the headstock 120 or the main body 122, individually, of the headstock 120 is within the second cavity 1120. The second cavity 1120 also includes finger slots 1122 to allow for minimal to no clearance of the headstock 120 or the main body 122, individually, of the headstock 120 to the sidewall of the second cavity 1120, while permitting the user to more readily or easily insert or remove the headstock 120 or the main body 122, individually, of the headstock 120 from the second cavity 1120.

The main body 1102 also includes a third cavity 1130 in which to store at least a portion of the neck 110 of the stringed instrument. The third cavity 1130 can be complementary in shape to the neck 110 or a portion thereof. The third cavity 1130 can be sized to provide minimal clearance (e.g., 1 millimeter, 1 centimeter, or the like) or no clearance (e.g., the neck 110 contacts the sidewall) of the neck 110 relative to a sidewall of the third cavity 1130 when the neck 110 is within the third cavity 1130. A first portion of the neck 110, for example, can be stored within the third cavity 1130 and a second portion of the neck 110 can rest on the body 802 when the body 802 is within the first cavity 1110.

The components of the stringed instrument discussed herein can be composed of a variety of different materials including, but not limited to, ceramics, metals, woods, polymers, plastics, the like, or combinations or multiples thereof. The components of the case discussed herein can be composed of a variety of different materials including, but not limited to, ceramics, metals, woods, polymers, plastics, foams, the like, or combinations or multiples thereof.

Any list or options presented in an alternative form, such as "or," is not intended to be limited just one of the list components. The "or" is intended to include "the like, or combinations of multiples thereof," thereby permitting for additional or alternative components, combinations of components, or a plurality of one or more components.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents.

What is claimed is:

1. A modular stringed instrument having a body and strings, comprising:

a headstock to which the strings connect, the headstock including a hole;

a neck along which the strings extend to connect to the headstock, the neck including a bore; and a mechanical connector separably attached the headstock and the neck, the mechanical connector providing a moment arm at a neck-headstock interface at which the neck and the headstock physically engage with each other, wherein the mechanical connector is a threaded connector bolt that extends through the hole of the headstock and the bore of the neck, each of the hole of the headstock and the bore of the neck including threading configured to receive the threaded connector bolt.

2. The instrument of claim 1, wherein the headstock further includes a cavity into which the mechanical connector is fitted after extending through the hole of the headstock.

3. The instrument of claim 2, wherein a washer is fitted within the cavity of the headstock and through which the threaded connector bolt is fitted.

4. The instrument of claim 3, wherein the washer is threaded to mate with threading of the threaded connector bolt.

5. The instrument of claim 3, wherein the washer is fitted around an entire axial perimeter of the threaded connector bolt.

6. The instrument of claim 2, wherein the cavity of the headstock has a first portion into which a washer is fitted that has width greater than a second, adjacent portion into which the threaded connector bolt is fitted.

7. The instrument of claim 1, further comprising a locking nut that engages with the strings and is positioned at the neck-headstock interface.

8. The instrument of claim 1, further comprising a bracket releasably attached to the headstock and the neck.

9. The instrument of claim 8, wherein the bracket is releasably attached to the headstock and the neck with respective threaded bolts.

10. The instrument of claim 8, wherein the bracket is releasably attached to the headstock with a single threaded bolt and to the neck with two threaded bolts.

11. The instrument of claim 1, further comprising an elevation positioned on the neck adjacent to the neck-headstock interface.

12. The instrument of claim 11, wherein the elevation is integrated into the neck and positioned at the neck-headstock interface.

13. The instrument of claim 12, wherein the mechanical connector is attached to the neck where the elevation is positioned.

14. The instrument of claim 12, wherein the neck further includes a cavity into which an insert is fitted, and wherein a bracket is releasably attached to the neck by securing the mechanical connector to secure the bracket to the insert.

15. The instrument of claim 14, wherein the insert includes a threaded opening that mates with the threaded connector bolt.

16. The instrument of claim 14, wherein the cavity is first cavity and the insert is a first insert, and the neck further includes a second cavity into which a second insert is fitted, and wherein the bracket is releasably attached to the neck by securing respective mechanical connectors to secure the bracket to the first insert and the second insert.

17. The instrument of claim 16, wherein the first cavity and the second cavity are positioned on either side of a hole of the neck into which the mechanical connector is fitted.

18. The instrument of claim 17, wherein the bracket is also releasably attached to the headstock by the mechanical connector so that the bracket extends across the neck-headstock interface.

19. The instrument of claim 1, wherein the neck-headstock interface for an angle or curve corresponding to the angle or curve at which the neck and the headstock are aligned.

* * * * *